(12) United States Patent
Asada

(10) Patent No.: US 10,038,568 B2
(45) Date of Patent: Jul. 31, 2018

(54) MANAGEMENT DEVICE, MANAGEMENT METHOD, AND COMPUTER PROGRAM PRODUCT

(71) Applicant: Kazushige Asada, Kanagawa (JP)

(72) Inventor: Kazushige Asada, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 186 days.

(21) Appl. No.: 15/069,536

(22) Filed: Mar. 14, 2016

(65) Prior Publication Data

US 2016/0277200 A1    Sep. 22, 2016

(30) Foreign Application Priority Data

Mar. 19, 2015  (JP) ................................ 2015-056984

(51) Int. Cl.
  *G06F 15/173*  (2006.01)
  *H04L 12/18*  (2006.01)

(52) U.S. Cl.
  CPC ............................... *H04L 12/1822* (2013.01)

(58) Field of Classification Search
  CPC ........................... G06F 9/4862; H04L 12/1822
  USPC .................................................. 709/223, 226
  See application file for complete search history.

(56) References Cited

U.S. PATENT DOCUMENTS

| 8,700,537 | B1* | 4/2014 | Deshpande | ........ | G06Q 10/0834 |
| | | | | | 705/1.1 |
| 2007/0011281 | A1* | 1/2007 | Jhoney | ................... | G06Q 10/10 |
| | | | | | 709/220 |
| 2012/0254965 | A1* | 10/2012 | Parker | ................. | H04L 63/0838 |
| | | | | | 726/7 |
| 2013/0159040 | A1* | 6/2013 | Sarmenta | ............... | G06Q 10/06 |
| | | | | | 705/7.15 |
| 2014/0208325 | A1* | 7/2014 | Chen | ..................... | G06F 9/4881 |
| | | | | | 718/102 |
| 2014/0298409 | A1* | 10/2014 | Mock | ..................... | H04L 63/20 |
| | | | | | 726/1 |
| 2016/0054972 | A1 | 2/2016 | Igawa | | |

FOREIGN PATENT DOCUMENTS

| JP | 2003-330677 | 11/2003 |
| JP | 2004-272380 | 9/2004 |
| JP | 2004-362045 | 12/2004 |
| JP | 2006-092368 | 4/2006 |
| JP | 4492276 | 4/2010 |
| JP | 2016-045725 | 4/2016 |

* cited by examiner

*Primary Examiner* — Phuoc Nguyen
(74) *Attorney, Agent, or Firm* — Harness, Dickey & Pierce, P.L.C.

(57) ABSTRACT

A management device that manages a task that is executed by a plurality of users cooperatively includes an electronic data access unit, a management unit, and a past task storage unit. The electronic data access unit accesses electronic data. The management unit manages, for each task executed using the management device, task information in which pieces of authentication information of the users who have participated in the task are associated with access destination information indicating an access destination of the electronic data accessed by the electronic data access unit in the task. The past task storage unit stores therein the task information of a past task executed using the management device. The management unit generates the task information of a new task based on the task information of the past task that is stored in the past task storage unit.

18 Claims, 14 Drawing Sheets

TASK INFORMATION OF TASK THAT IS BEING CURRENTLY EXECUTED

| TASK ID | PARTICIPANT USER | ACCESS DESTINATION OF DOCUMENT, AUTHENTICATION TICKET INFORMATION |
|---|---|---|
| 0023 | A, B, C, D | α, XXXXX<br>β, XXXXX |

TASK INFORMATION OF PAST TASK

| TASK ID | PARTICIPANT USER | ACCESS DESTINATION OF DOCUMENT, AUTHENTICATION TICKET INFORMATION | USABLE PERIOD |
|---|---|---|---|
| 0023 | A, B, C, D | $\alpha$, XXXXX<br>$\beta$, XXXXX | XXXX,XX,XX |
| 0035 | E, F | $\gamma$, XXXXX<br>$\delta$, XXXXX | XXXX,XX,XX |
| 0127 | A, G, H | $\alpha$, XXXXX<br>$\varepsilon$, XXXXX | XXXX,XX,XX |
| ⋮ | ⋮ | ⋮ | ⋮ |

TASK INFORMATION OF PAST TASK

| TASK ID | PARTICIPANT USER | ACCESS DESTINATION OF DOCUMENT, AUTHENTICATION TICKET INFORMATION |
|---|---|---|
| 1738 | A, B | α, XXXXX<br>β, XXXXX |

TAKE OVER

TASK INFORMATION OF NEW TASK

| TASK ID | PARTICIPANT USER | ACCESS DESTINATION OF DOCUMENT, AUTHENTICATION TICKET INFORMATION |
|---|---|---|
| 2712 | A, B | α, XXXXX<br>β, XXXXX |

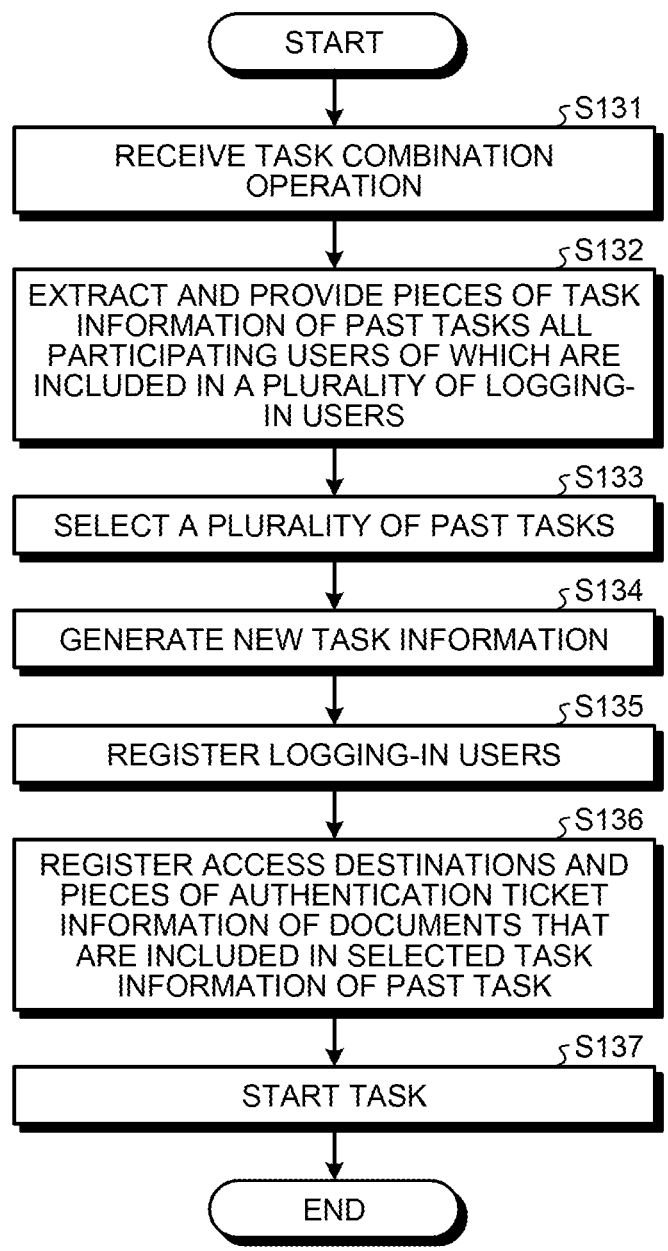

FIG.15

TASK INFORMATION OF PAST TASK

| TASK ID | PARTICIPANT USER | ACCESS DESTINATION OF DOCUMENT, AUTHENTICATION TICKET INFORMATION |
|---|---|---|
| 3513 | A, B, C, D | α, XXXXX<br>β, XXXXX<br>γ, XXXXX<br>δ, XXXXX |

PARTIALLY EXTRACT

TASK INFORMATION OF NEW TASK

| TASK ID | PARTICIPANT USER | ACCESS DESTINATION OF DOCUMENT, AUTHENTICATION TICKET INFORMATION |
|---|---|---|
| 5243 | A, B | α, XXXXX<br>β, XXXXX |

FIG.16

TASK INFORMATION OF PAST TASK

| TASK ID | PARTICIPANT USER | ACCESS DESTINATION OF DOCUMENT, AUTHENTICATION TICKET INFORMATION |
|---|---|---|
| 3513 | A, B, C, D | α, XXXXX<br>β, XXXXX<br>γ, XXXXX<br>δ, XXXXX |

PARTIALLY EXTRACT

TASK INFORMATION OF NEW TASK

| TASK ID | PARTICIPANT USER | ACCESS DESTINATION OF DOCUMENT, AUTHENTICATION TICKET INFORMATION |
|---|---|---|
| 5244 | A, B, C, D | α, XXXXX<br>β, XXXXX |

MANAGEMENT DEVICE, MANAGEMENT METHOD, AND COMPUTER PROGRAM PRODUCT

CROSS-REFERENCE TO RELATED APPLICATIONS

The present application claims priority to and incorporates by reference the entire contents of Japanese Patent Application No. 2015-056984 filed in Japan on Mar. 19, 2015.

BACKGROUND OF THE INVENTION

1. Field of the Invention

The present invention relates to a management device, a management method, and a computer program product.

2. Description of the Related Art

A plurality of users carry out a task using one device cooperatively in some cases. For example, a plurality of users carry out a task using one interactive whiteboard (electronic blackboard) cooperatively in some cases. In this case, a situation where the users carry out the task by referring to electronic data through the interactive whiteboard can occur. It is conceivable that the users access electronic data, for example, a first document created by a first user previously and a second document created by a second user previously.

Furthermore, for example, another task different in combination of participant users is carried out in a different period of time or a task with the same combination of users is carried out regularly using the same interactive whiteboard in some cases. The participating user leaves the task in the middle, a task theme is changed or divided, or a plurality of task themes are integrated in some cases.

In these cases, for example, a manager needs to execute, for the device (for example, interactive whiteboard) that is used cooperatively, procedures such as creation of a new task, registration of users of each task, and deletion of an unnecessary task. Accordingly, a burden on the manager increases undesirably. Furthermore, increase in the number of users who can be the managers causes a security problem more seriously.

Therefore, there is a need for a management device, a management method, and a computer program product that enable a new task to be easily set when a plurality of users carry out the task cooperatively.

SUMMARY OF THE INVENTION

It is an object of the present invention to at least partially solve the problems in the conventional technology.

According to an embodiment, a management device that manages a task that is executed by a plurality of users cooperatively includes an electronic data access unit, a management unit, and a past task storage unit. The electronic data access unit accesses electronic data. The management unit manages, for each task executed using the management device, task information in which pieces of authentication information of the users who have participated in the task are associated with access destination information indicating an access destination of the electronic data accessed by the electronic data access unit in the task. The past task storage unit stores therein the task information of a past task executed using the management device. The management unit generates the task information of a new task based on the task information of the past task that is stored in the past task storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a flowchart illustrating processing when the past tasks are combined and the new task is started;

FIG. 15 is a diagram illustrating a first example of task information of a new task created by extracting a part of a past task;

FIG. 16 is a diagram illustrating a second example of task information of a new task created by extracting a part of the past task;

DETAILED DESCRIPTION OF THE PREFERRED EMBODIMENTS

Hereinafter, a management system 10 according to an embodiment will be described in detail with reference to the drawings. The management system 10 in the embodiment aims at easy access to a plurality of pieces of electronic data for which permission is given to different users.

Figure 1:
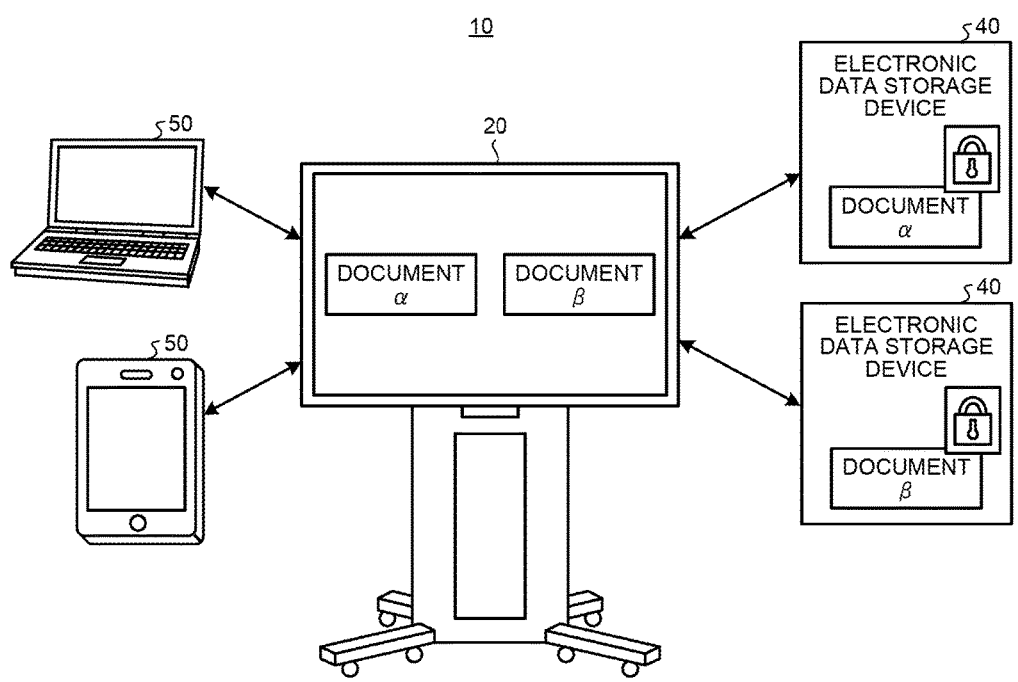
FIG. 1 is a diagram illustrating the configuration of a management system according to an embodiment.

FIG. 1 is a diagram illustrating the configuration of the management system 10 in the embodiment. The management system 10 includes a management device 20, at least one electronic data storage device 40, and at least one terminal device 50.

The management device 20 is an information processing device having a user authentication function, an information input function, an information output function, a communication function, and the like. In the embodiment, the management device 20 is an electronic blackboard (interactive whiteboard). The management device 20 is not limited to the electronic blackboard and may be a common computer, a tablet terminal, or a smart phone as long as a plurality of users can use the management device 20. The management device 20 may be a video conference terminal, a telephone terminal such as an Internet protocol (IP) telephone and an Internet telephone, a car navigation terminal, a wearable terminal, a camera, a game console, or an industry device having a communication function. The industrial device includes an office device such as a multifunction peripheral/printer/product (MFP), a medical device such as an endoscope, and an agricultural device such as a cultivator.

The management device 20 manages a task that is executed by a plurality of users cooperatively. For example, the task is a conference that is executed by the users. When the task is the conference, the management device 20 displays and records characters, figures, and the like written or drawn by the individual users, records remarks of the users, and so on in the conference. The task is not limited to the conference and may be a creative activity, editorial work, a presentation, a seminar, and other activities that are executed by the users.

Each electronic data storage device 40 stores therein electronic data used in the task that is managed by the management device 20. The electronic data storage device 40 may be any device as long as the management device 20 can be connected to the device. For example, the electronic data storage device 40 may be a server device connected to the management device 20 through a network or may be a memory card or a hard disk that is mounted on the management device 20.

The electronic data that is stored in the electronic data storage device 40 can be a document, a video image, an image, and audio data. FIG. 1 illustrates an example where the document is stored as an example of the electronic data. In one example, the document may be a hypertext markup language (HTML) document such as a Web page or an extensible markup language (XML) document. The document may be a text data file, an image data file, or a presentation data file. Furthermore, the document may be a record of a database.

Each electronic data is created by the individual user in advance before the task that would be executed by the users cooperatively is carried out. Permission to access (for example, refer to or update) each electronic data is given to a specified user (for example, user who has created the electronic data) and users other than the specified user cannot access the electronic data. When the electronic data is accessed from any information processing device, the electronic data authenticates whether the information processing device is a device that is operated by the user having permission.

Authentication may be executed by any method. For example, the electronic data may request input of a user name and a password from the information processing device that has accessed the electronic data and may determine whether the input user name and password are valid. Alternatively, the electronic data may cause a card reader connected to the information processing device that has accessed the electronic data to read information in an IC card or the like and may determine whether the read information is valid. Alternatively, the electronic data may execute the authentication with a computer program or the like incorporated into the electronic data itself. Still alternatively, the electronic data may redirect the access from the information processing device to an external authentication server and may cause the authentication server to execute the authentication.

When each pieces of electronic data can authenticate the access from the information processing device that is operated by the user having permission, the electronic data gives authentication ticket information to the information processing device. The authentication ticket information is certificate data for certificating the authentication. For example, when a web browser accesses the electronic data, the authentication ticket information may be a cookie. When the electronic data redirects the access to the authentication server for authentication, the authentication server may issue the authentication ticket information. In this case, the electronic data receives the access from the information processing device using the authentication ticket information, without authentication processing.

The terminal device 50 may be a common computer. The terminal device 50 may be a tablet terminal or a smart phone. The terminal device 50 is operated by a user. The terminal device 50 can access the management device 20 through a network.

In the management system 10, a plurality of users log in the management device 20 simultaneously and execute one task cooperatively. The management device 20 accesses the pieces of electronic data that have been created by the different users previously and are used in the task. In this case, when the management device 20 accesses the pieces of electronic data in a switching manner, the authentication is requested for the first access to the electronic data but the authentication is not requested for second and subsequent accesses to the pieces of electronic data. This enables the management device 20 to easily access the pieces of electronic data created by the different users previously.

Furthermore, after the task is finished, the management device 20 accepts access to the electronic data used in the task from the terminal device 50 that is operated by a first user who has participated in the task. In this case, the management device 20 accesses the electronic data instead of the terminal device 50 without authentication for the access to the electronic data.

Figures 2, 3:
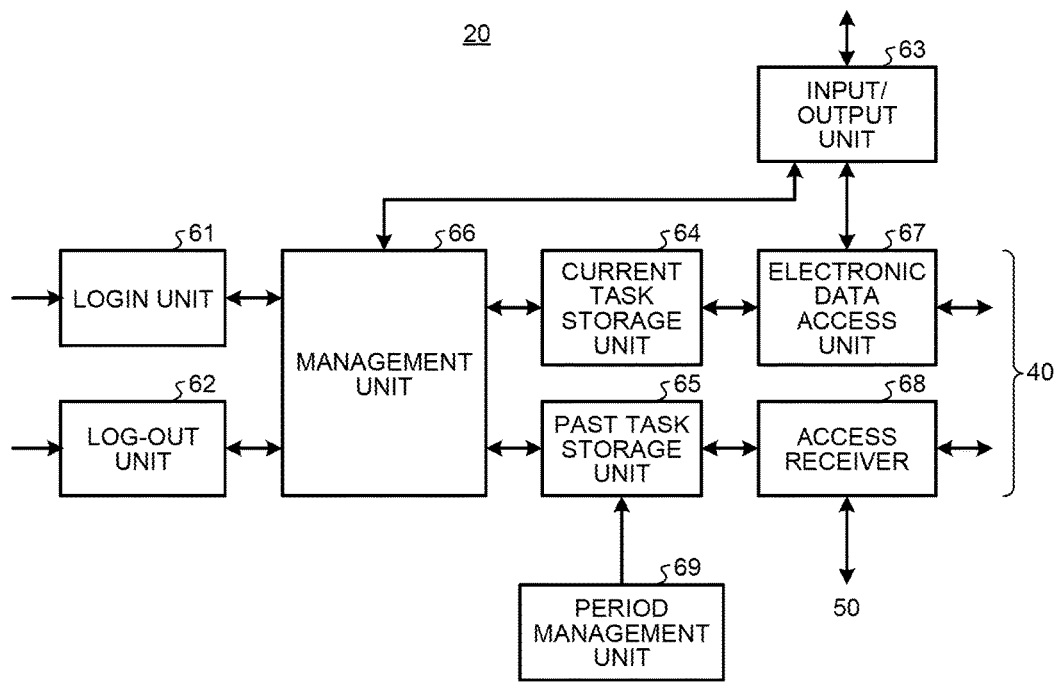
FIG. 2 is a diagram illustrating the functional configuration of a management device.
FIG. 3 is a diagram illustrating an example of task information of a task that is being executed.
Figures 4, 5:
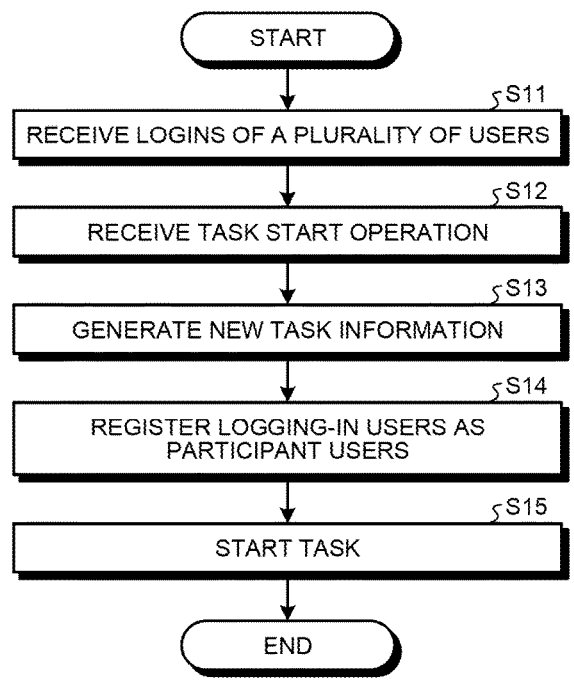
FIG. 4 is a diagram illustrating an example of pieces of task information of past tasks.
FIG. 5 is a flowchart illustrating processing when a task is started.

FIG. 2 is a diagram illustrating the functional configuration of the management device 20. FIG. 3 is a diagram illustrating an example of task information of a task that is being executed. FIG. 4 is a diagram illustrating an example of pieces of task information of past tasks.

The management device 20 includes a login unit 61, a logout unit 62, an input/output unit 63, a current task storage unit 64, a past task storage unit 65, a management unit 66, an electronic data access unit 67, an access receiver 68, and a period management unit 69.

The login unit 61 receives logins of users participating in the task. The login unit 61 authenticates the users at the time of logins. The logout unit 62 receives logouts of the users.

The input/output unit 63 receives input of information from the users participating in the task. The input/output unit 63 outputs information to the users participating in the task.

The current task storage unit 64 stores therein task information of the task that is being executed. The task information of the task that is being executed includes a task ID for identifying the task, users (participant users) participating in the task being executed, and access destinations of a plurality of documents that are used in the task being executed and pieces of authentication ticket information for accessing the corresponding documents, as illustrated in FIG. 3.

The past task storage unit 65 stores therein pieces of task information of past tasks. The task information of the past task includes, for each past task, a task ID, users (participant users) that have participated in the task, access destinations of documents used in the task and pieces of authentication ticket information for accessing the corresponding documents, and usable periods of the pieces of authentication ticket information, as illustrated in FIG. 4. When the task information includes a plurality of pieces of authentication ticket information, the task information of the past task may include the usable periods for the respective pieces of authentication ticket information or may include one usable period common to the pieces of authentication ticket information.

The management unit 66 manages the task information of the task being executed that is stored in the current task storage unit 64 and the pieces of task information of the past tasks that are stored in the past task storage unit 65. The management unit 66 generates the task information of the task that is being executed and causes the current task storage unit 64 to store the task information when the task is started. The management unit 66 copies contents of the task information of the task that is being executed to generate the task information of the past task and causes the past task storage unit 65 to store the generated task information additionally when the task is finished. In this case, the management unit 66 incorporates the usable periods of the pieces of authentication ticket information in the added task information of the past task. The usable period of the authentication ticket information may be a predetermined period or a period input by the user participating in the task.

The electronic data access unit 67 accesses the pieces of electronic data for which permission is given to the different users. To be more specific, when accessing a certain piece of electronic data in accordance with an instruction from the user participating in the task that is being executed, the electronic data access unit 67 reads out the authentication ticket information corresponding to the target electronic data from the task information stored in the current task storage unit 64. Then, the electronic data access unit 67 accesses the electronic data using the read authentication ticket information.

When the task information stored in the current task storage unit 64 does not include the authentication ticket information corresponding to the target electronic data, the electronic data access unit 67 prompts the user having the permission to input the authentication information and accesses the electronic data. Furthermore, the electronic data access unit 67 acquires the authentication ticket information corresponding to the accessed electronic data and writes the acquired authentication ticket information into the task information. With this processing, the electronic data access unit 67 can access the same electronic data using the authentication ticket information with no need to prompt the user to input the authentication information from then on.

The access receiver 68 accepts access from the terminal device 50 that is operated by the first user to the electronic data used in the past task in which the first user has participated. When receiving the access from the terminal device 50 that is operated by the first user to the electronic data, the access receiver 68 acquires the authentication ticket information included in the task information stored in the past task storage unit 65 and corresponding to the past task in which the first user has participated. Then, the access receiver 68 accesses the electronic data instead of the terminal device 50 using the acquired authentication ticket information. In this case, when referring to the electronic data, the access receiver 68 provides referred electronic data to the terminal device 50.

When accessing the electronic data in accordance with the access from the terminal device 50 that is operated by the first user, the access receiver 68 may notify the user having the permission to access the electronic data of the access from the first user. In one example, the access receiver 68 notifies the user of the access by an e-mail or other means. With this notification, the access receiver 68 can perform more secure operation.

The period management unit 69 deletes the authentication ticket information that has reached the usable period among the pieces of authentication ticket information included in task information of the past tasks stored in the past task storage unit 65. This processing enables the period management unit 69 to forbid the electronic data from being accessed using the authentication ticket information that has reached the usable period.

FIG. 5 is a flowchart illustrating processing when a task is started. When starting the task, the management device 20 proceeds the processing in accordance with the flow as illustrated in FIG. 5.

First, at step S11, the management device 20 receives logins of a plurality of users. When the login operations of the users are completed, subsequently, the management device 20 receives a task start operation at step S12.

Then, at step S13, the management device 20 generates new task information and causes the current task storage unit 64 to store the new task information. Subsequently, at step S14, the management device 20 registers the logging-in users as the participant users in the new task information. At step S15, the management device 20 starts management of the cooperative task that is executed by the users.

Figure 6:
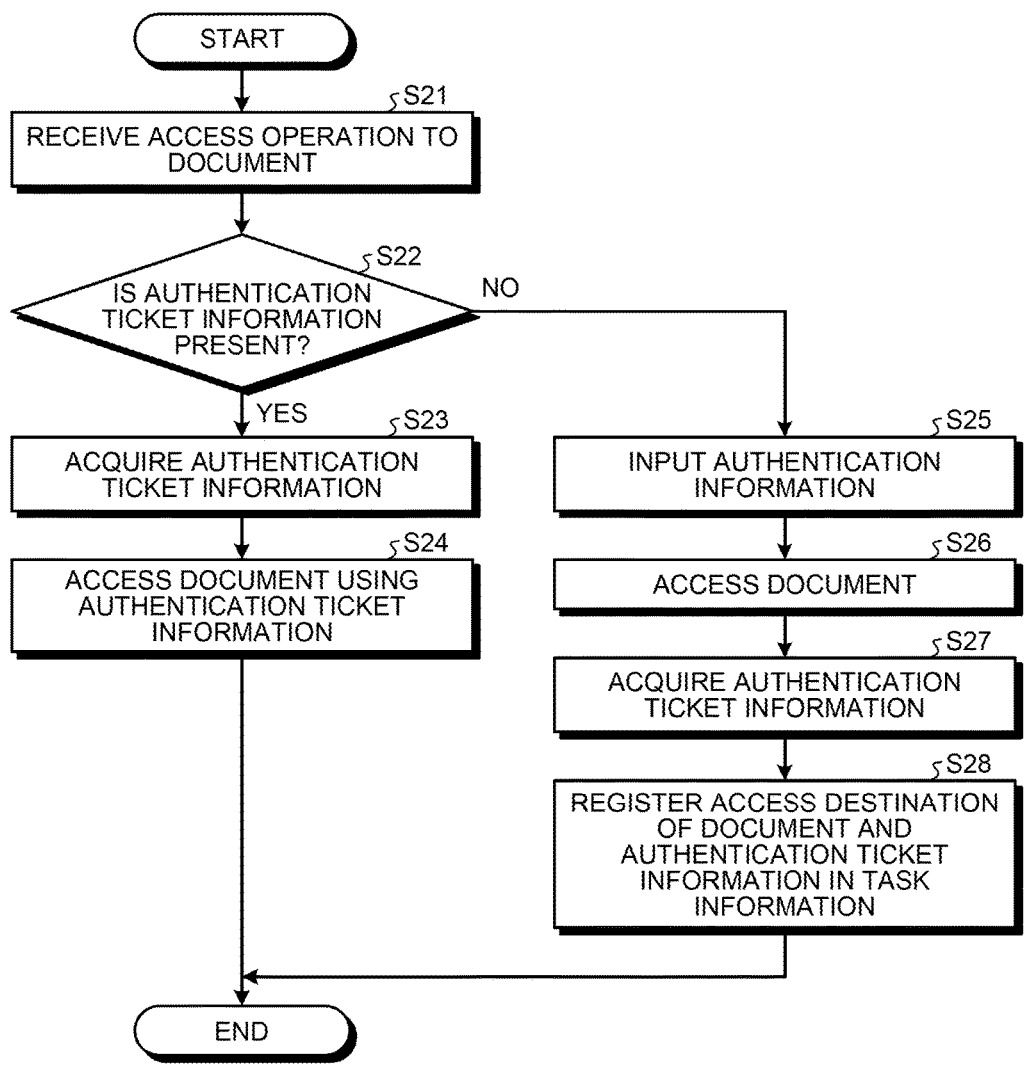
FIG. 6 is a flowchart illustrating processing when a document is accessed.

FIG. 6 is a flowchart illustrating processing when electronic data is accessed. Although the flowchart as illustrated in FIG. 6 explains an example when the electronic data is document, the management device 20 executes similar processing on the electronic data other than document. When the document is used in the task that is being executed, the management device 20 proceeds the processing in accordance with the flow as illustrated in FIG. 6.

First, at step S21, the management device 20 receives an access operation to the document from any of the users participating in the task. For example, when the user desires to refer to the document, the management device 20 receives input of information indicating an access destination (for example, a file name and a storage destination of a file) of the document. Alternatively, the user clicks a specific icon, whereby the management device 20 may receive the input of the access destination of the document corresponding to the specific icon. Furthermore, for example, when the user desires to update the document, the management device 20 receives input of the access destination of the document and actual data of the document to be updated.

Subsequently, at step S22, the management device 20 refers to the task information of the task being executed that is stored in the current task storage unit 64, so as to determine whether the authentication ticket information corresponding to the input access destination of the document is present.

When the authentication ticket information corresponding to the input access destination of the document is present in the task information of the task being executed (Yes at step S22), the management device 20 proceeds the processing to step S23. At step S23, the management device 20 acquires the corresponding authentication ticket information from the task information. Subsequently, at step S24, the management device 20 accesses the document indicated by the input access destination using the acquired authentication ticket information. When receiving the access using the valid authentication ticket information, the document accepts the access without requesting for the authentication. For example, when the document is accessed for reference, the management device 20 acquires the document from the electronic data storage device 40 and provides the document thus acquired to the user. The management device 20 finishes this flow with completion of the processing at step S24.

When the authentication ticket information corresponding to the input access destination of the document is not present in the task information of the task being executed (No at step S22), the management device 20 proceeds the processing to step S25. At step S25, the management device 20 receives an authentication request from the document indicated by the input access destination and prompts the user having the permission to input the authentication information. When the input authentication information is valid, the document accepts the access.

When the authentication information is valid, subsequently, the management device 20 accesses the document at step S26. For example, when the document is accessed for reference, the management device 20 acquires the document from the electronic data storage device 40 and provides the document thus acquired to the user. Thereafter, at step S27, the management device 20 acquires the authentication ticket information from the accessed document. At step S28, the management device 20 registers the acquired authentication ticket information and the access destination of the document in the task information of the task that is being executed. This registration enables the management device 20 to access the same document using the authentication ticket information with no need to prompt the user to input the authentication information when the management device 20 accesses the document from then on. The management device 20 finishes this flow with completion of the processing at step S28.

Figure 7:
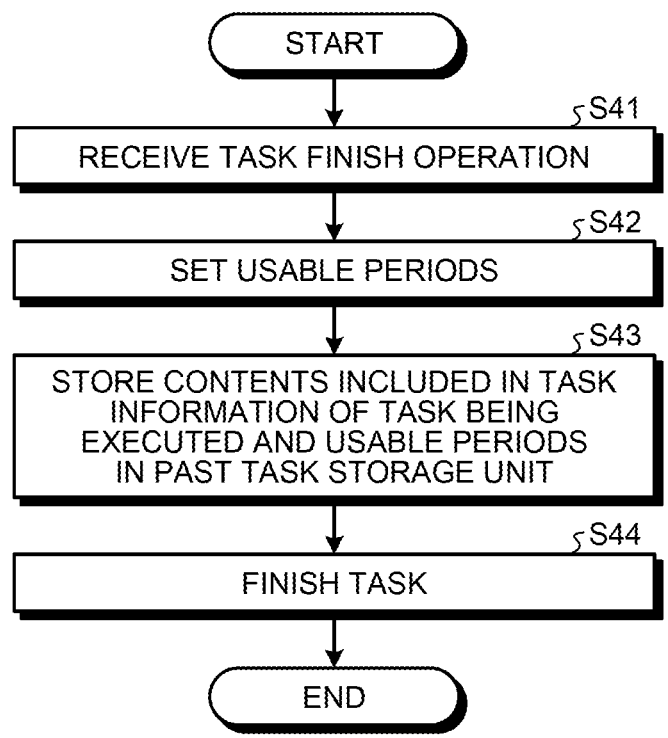
FIG. 7 is a flowchart illustrating processing when a task is finished.

FIG. 7 is a flowchart illustrating processing when a task is finished. Although the flowchart as illustrated in FIG. 7 explains an example when the electronic data is document, the management device 20 executes similar processing on the electronic data other than document. The management device 20 proceeds the processing in accordance with the flow as illustrated in FIG. 7 when finishing the task.

First, at step S41, the management device 20 receives a task finish operation. Subsequently, at step S42, the management device 20 sets the usable periods of the documents used in the task. The management device 20 may set predetermined periods as the usable periods or may prompt the users participating in the task to input the usable periods.

Subsequently, at step S43, the management device 20 additionally stores, as the task information of the past task, contents included in the task information of the task being executed and the set usable periods in the past task storage unit 65. After the additional storing, the management device 20 deletes the task information of the task being executed from the current task storage unit 64. Then, at step S44, the management device 20 finishes the task that is being executed.

Figure 8:
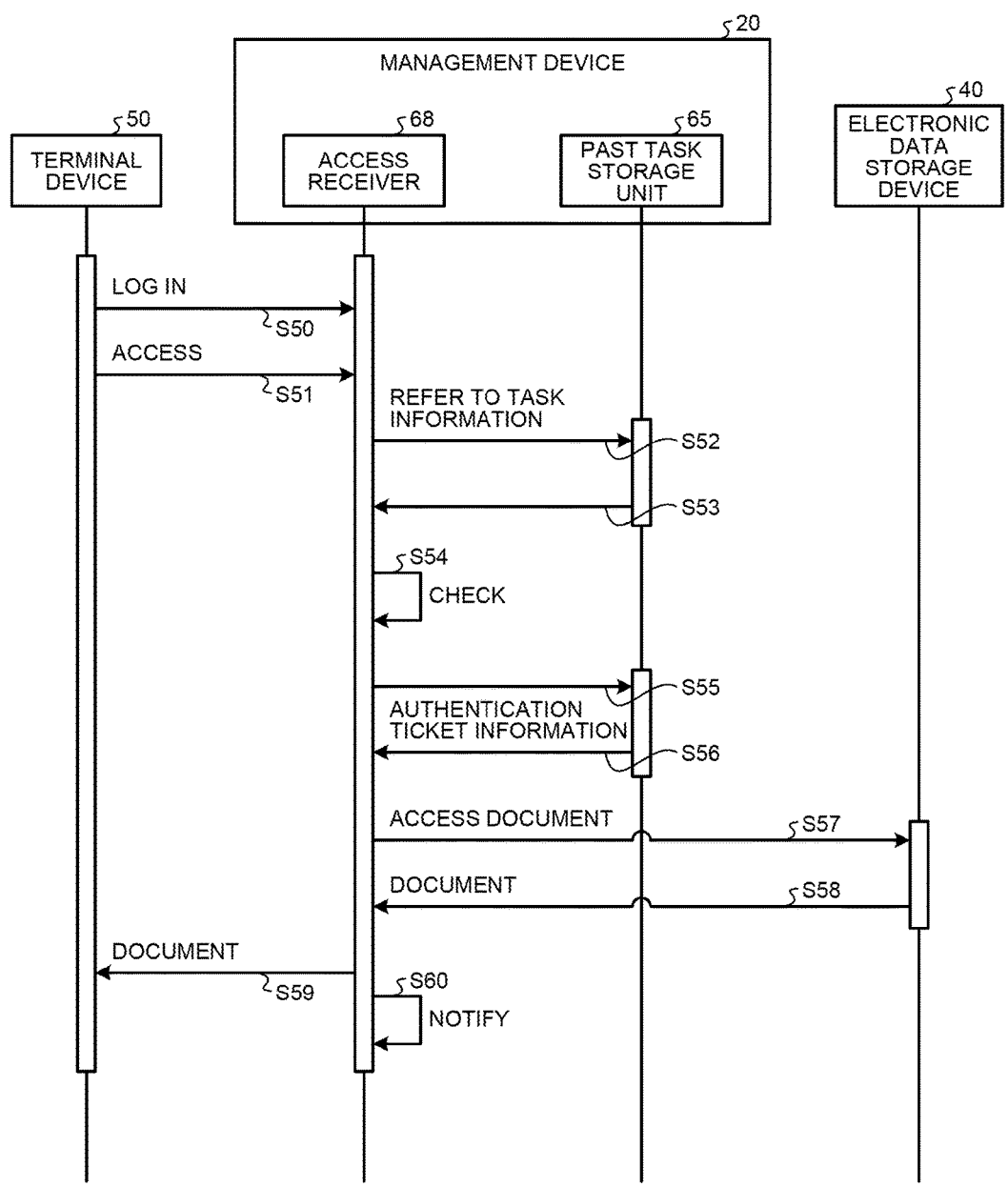
FIG. 8 is a sequence diagram illustrating processing when a terminal device accesses a document after a task is finished.

FIG. 8 is a sequence diagram illustrating processing when the terminal device 50 accesses the document after the task is finished. The users that have participated in the task can access the documents used in the task through the management device 20 before the usable periods of the documents expire even when the users do not have the permission therefor. In this case, the management device 20 proceeds the processing in accordance with the sequence as illustrated in FIG. 8.

The terminal device 50 logs in the management device 20 through a network in accordance with an operation by the first user (S50). When the login operation is succeeded, subsequently, the terminal device 50 specifies a task ID and information indicating an access destination (for example, a file name and a storage destination of a file) of a document and transmits, to the management device 20, an access request to the document (S51).

Upon receiving the access request, the access receiver 68 of the management device 20 refers to the task information of the past task corresponding to the specified task ID in the past task storage unit 65 (S52 and S53). Then, the access receiver 68 checks whether the participant users in the task information corresponding to the specified task ID include the first user (S54). When the first user is not included therein as a result of the check, the access receiver 68 notifies the terminal device 50 of access failure and finishes the processing.

When the participant users include the first user, the access receiver 68 acquires the authentication ticket information of the specified document from the task information of the past task corresponding to the specified task ID (S55 and S56). When the authentication ticket information is not present because of expiration of the usable period, for example, the access receiver 68 notifies the terminal device 50 of access failure and finishes the processing.

When the access receiver 68 acquires the authentication ticket information, it accesses the specified access destination of the document using the authentication ticket information (S57 and S58). When the document is accessed for reference, the access receiver 68 transmits, to the terminal device 50, the document acquired by referring (S59). Then, the access receiver 68 notifies the user having the permission for the accessed document of the access from the first user by an E-mail or other means (S60).

As described above, according to the management device 20 in the embodiment, when the first access to the document by is authenticated, the management device 20 can access the same document without authentication from then on even after the document to be accessed is switched. Accordingly, the management device 20 can easily access a plurality of documents for which different users have permission when the users carry out the task cooperatively.

Furthermore, the management device 20 receives access from the first user who has participated in the task using the terminal device 50 to the document used in the task after the task is finished. In this case, the management device 20 accesses the document instead of the terminal device 50. Accordingly, the management device 20 enables easy access to the documents that have been used in the task executed by the users cooperatively and for which permission is given to the different users.

It should be noted that, for example, the document may be a web page for booking a conference room, a web page for booking facility, and a web page for control to operate a device. In this case, after the task is finished, other users can access the web page that only a certain user having permission could have accessed during the task, instead of the certain user. Accordingly, the management device 20 in the embodiment can therefore control access more flexibly.

Figure 9:
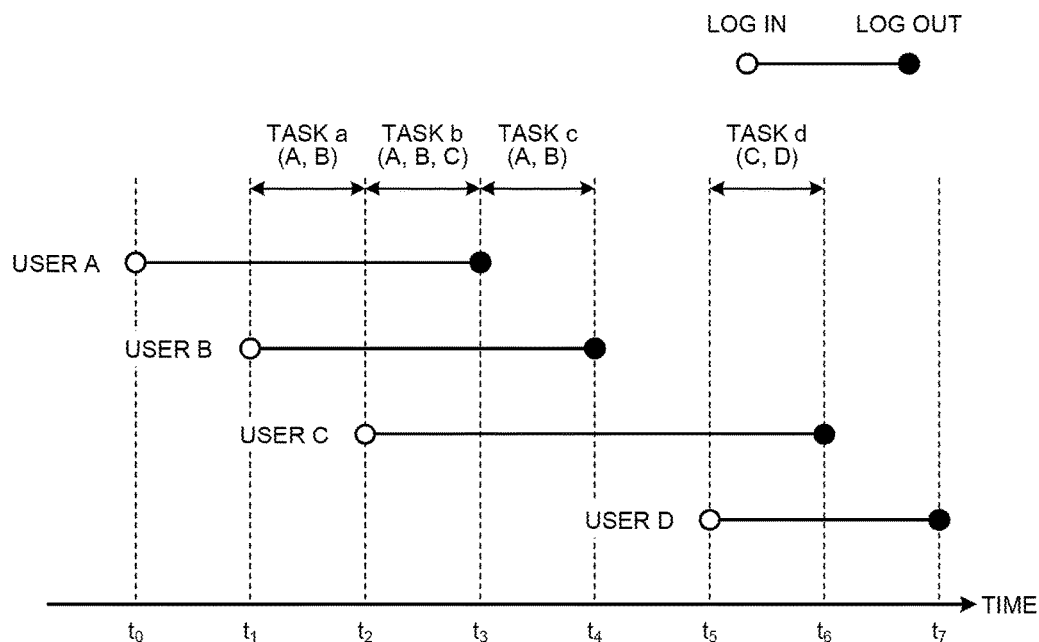
FIG. 9 is a diagram illustrating examples of login timings and logout timings of users and the users that have participated in each task.

FIG. 9 is a diagram illustrating examples of login timings and logout timings of users and the users that have participated in tasks. Timings at which the tasks are started and finished may not be timings at which the users instruct to start and finish the tasks clearly but may be timings at which any user logs in or logs out. In this case, the management unit 66 manages one task, as a unit, from the time at which the users access simultaneously and any user logs in or logs out to the time at which any user logs in or logs out next.

In the management, the management unit 66 incorporates the login time and the logout time of each user in the task information of the past task. The management unit 66 specifies the participant users in each task based on the login time and the logout time of the users.

For example, as illustrated in FIG. 9, it is assumed that a user A logs in at the time t0, a user B logs in at the time t1 after the time t0, and a user C logs in at the time t2 after the time t1. It is assumed that the user A logs out at the time t3 after the time t2 and the user B logs out at the time t4 after the time t3. Furthermore, it is assumed that a user D logs in at the time t5 after the time t4, the user C logs out at the time t6 after the time t5, and the user D logs out at the time t7 after the time t6.

In this case, the participant users of a task a between the time t1 and the time t2 are the user A and the user B. The participant users of a task b between the time t2 and the time t3 are the user A, the user B, and the user C. The participant users of a task c between the time t3 and the time t4 are the user B and the user C. The participant users of a task d between the time t5 and the time t6 are the user C and the user D. As described above, the management unit 66 incorporates the login time and the logout time of each user in the task information, thereby specifying the users participating in each task.

Figure 10:
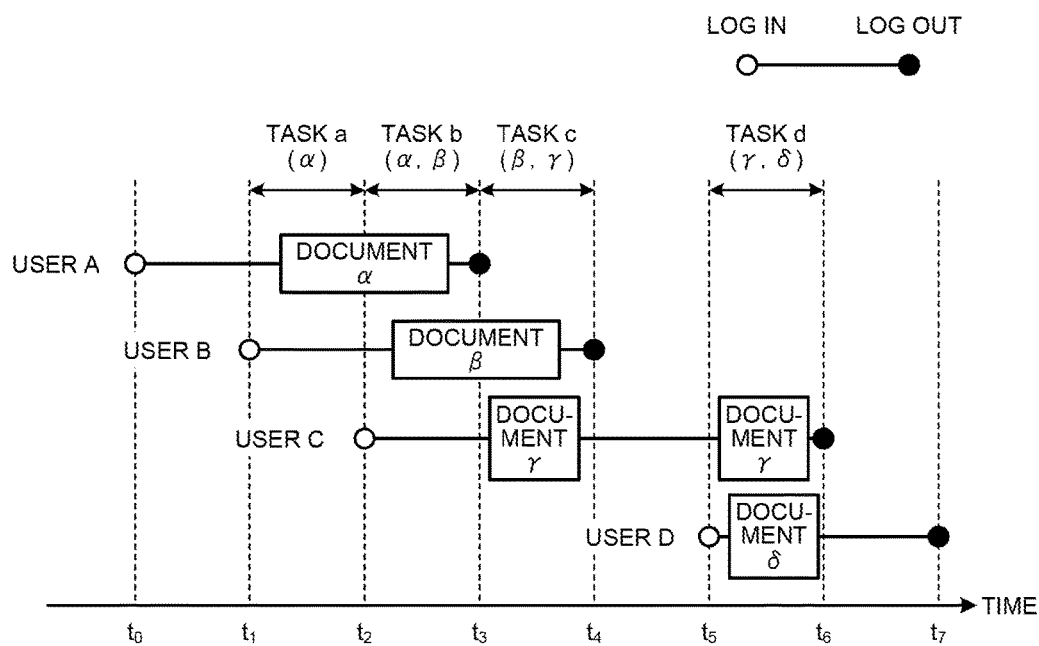
FIG. 10 is a diagram illustrating examples of the login timings and the logout timings of the users and documents that are used in each task.

FIG. 10 is a diagram illustrating examples of the login timings and the logout timings of the users and documents that are used in each task. Although FIG. 10 explains an example when the electronic data is document, the management device 20 executes similar processing on the electronic data other than document. When the management unit 66 manages one task, as a unit, from the time at which the users access simultaneously and any user logs in or logs out to the time at which any user logs in or logs out next, the management unit 66 incorporates access timings to the documents in the task information of each past task. The management unit 66 specifies the documents used in each task based on the access timings to the documents.

For example, as illustrated in FIG. 10, a document α is accessed between the time t1 and the time t2 and between the time t2 and the time t3. A document β is accessed between the time t2 and the time t3 and between the time t3 and the time t4. A document γ is accessed between the time t3 and the time t4 and between the time t5 and the time t6. A document δ is accessed between the time t5 and the time t6.

In this case, the document used in the task a between the time t1 and the time t2 is the document α. The documents used in the task b between the time t2 and the time t3 are the document α and the document β. The documents used in the task c between the time t3 and the time t4 are the document β and the document γ. The documents used in the task d between the time t5 and the time t6 are the document γ and the document δ. As described above, the management unit 66 incorporates the access timings to the documents in the pieces of task information, thereby specifying the documents used in each task.

Figure 11:
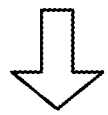
FIG. 11 is a diagram illustrating task information of a new task taking over a past task.

FIG. 11 is a diagram illustrating task information of a new task taking over a past task. Although FIG. 11 explains an example when the electronic data is document, the management device 20 executes similar processing on the electronic data other than document. For example, when the management unit 66 of the management device 20 starts the new task, it may generate the task information of the new task based on the task information of the past task. In this case, the management unit 66 may generate the task information of the new task while taking over the task information of the past task as it is.

For example, as illustrated in FIG. 11, the management unit 66 generates the task information of the new task while taking over the participant users, and the access destinations and the pieces of authentication ticket information of the documents that are included in the task information of any of the past tasks stored in the past task storage unit 65. With this, when the management unit 66 continues the past task or carries out the task with the same theme regularly, the management unit 66 can carry out the new task while taking over the past information as it is.

Figure 12:
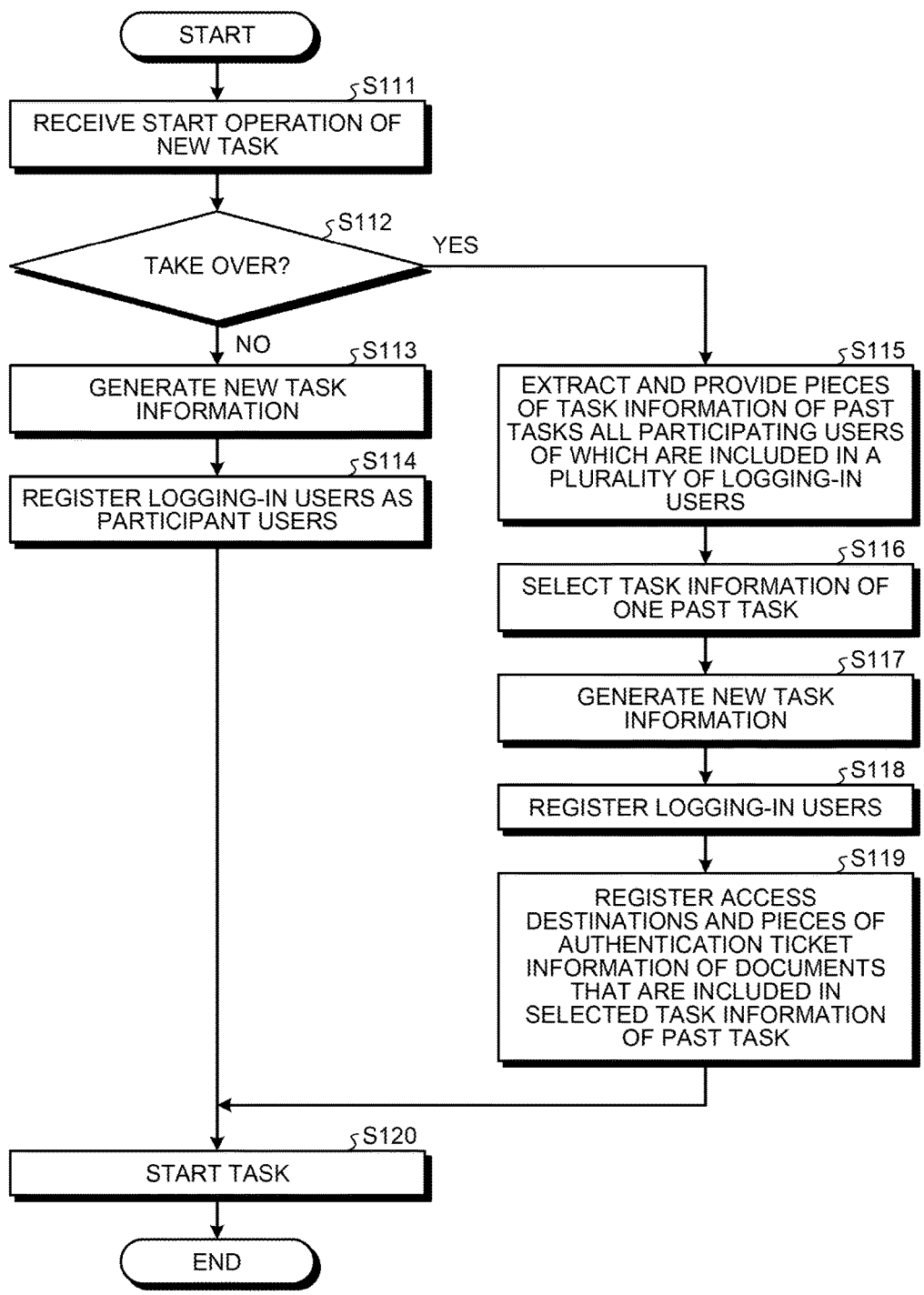
FIG. 12 is a flowchart illustrating processing when the new task is started while taking over the past task.

FIG. 12 is a flowchart illustrating processing when the new task is started while taking over the past task. Although the flowchart as illustrated in FIG. 12 explains an example when the electronic data is document, the management device 20 executes similar processing on the electronic data other than document. When starting the new task taking over the past task, the management unit 66 proceeds the processing in accordance with the flow as illustrated in FIG. 12.

First, at step S111, the management unit 66 receives a start operation of the new task. Subsequently, at step S112, the management unit 66 inquires at a user whether to take over the past task.

When the new task does not take over the past task (No at S112), at step S113, the management unit 66 generates new task information and causes the current task storage unit 64 to store the new task information. Subsequently, at step S114, the management unit 66 registers the logging-in users as the participant users in the new task information. At step S120, the management unit 66 starts the cooperative task by the users.

When the new task takes over the past task (Yes at S112), at step S115, the management unit 66 extracts pieces of task information of past tasks all the participating users of which are included in the logging-in users from the past task storage unit 65 and provides the task information thus extracted. To be more specific, the management unit 66 extracts the pieces of task information of the past tasks the participant users of which are totally identical to the logging-in users, as well as the pieces of task information of the past tasks the participant users of which are totally identical to some of the logging-in users, and then provides the pieces of task information thus extracted.

Thereafter, at step S116, the management unit 66 receives selection of the task information of any one past task among the pieces of task information of the past tasks that have been provided. Then, at step S117, the management unit 66 generates the new task information and causes the current task storage unit 64 to store the new task information. At step S118, the management unit 66 registers the logging-in users as the participant users in the new task information. Subsequently, at step S119, the management unit 66 registers the access destinations and the pieces of authentication ticket information of the documents that are included in the selected task information of the past task in the task information of the new task.

At step S120, the management unit 66 starts the cooperative task by the users. In this manner, the management unit 66 can generate the task information of the new task while taking over the task information of the past task all the participating users of which are included in the logging-in users and start the new task.

Figure 13:
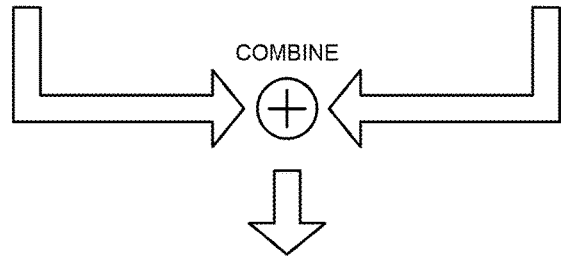
FIG. 13 is a diagram illustrating task information of a new task created by combining a plurality of past tasks.

FIG. 13 is a diagram illustrating task information of a new task created by combining a plurality of past tasks. Although FIG. 13 explains an example when the electronic data is document, the management device 20 executes similar processing on the electronic data other than document. The management unit 66 may generate the task information of the new task created by combining the pieces of task information of the past tasks.

For example, as illustrated in FIG. 13, the management unit 66 generates the task information of the new task by combining the participant users, and the access destinations and the pieces of authentication ticket information of the documents that are included in the pieces of task information of any of the past tasks stored in the past task storage unit 65. With this, when the management unit 66 integrates two tasks into one task, the management unit 66 can cause the new task to take over contents of the respective tasks.

FIG. 14 is a flowchart illustrating processing when the past tasks are combined and the new task is started. Although the flowchart as illustrated in FIG. 14 explains an example when the electronic data is document, the management device 20 executes similar processing on the electronic data other than document. When starting the new task created by combining the past tasks, the management unit 66 proceeds the processing in accordance with the flow as illustrated in FIG. 14.

First, at step S131, the management unit 66 receives a task combination operation. Subsequently, at step S132, the management unit 66 extracts pieces of task information of past tasks all the participating users of which are included in the logging-in users from the past task storage unit 65 and provides the pieces of task information thus extracted. Thereafter, at step S133, the management unit 66 receives selection of the pieces of task information of any of the past tasks among the pieces of task information of the past tasks that have been provided.

Then, at step S134, the management unit 66 generates the new task information and causes the current task storage unit 64 to store the new task information. Subsequently, at step S135, the management unit 66 registers the logging-in users as the participant users in the new task information. At step S136, the management unit 66 registers the access destinations and the pieces of authentication ticket information of the documents that are included in the selected pieces of task information of the past tasks in the task information of the new task.

At step S137, the management unit 66 starts the cooperative task by the users. In this manner, the management unit 66 can generate the task information of the new task by combining the pieces of task information of the past tasks and start the new task.

FIG. 15 is a diagram illustrating a first example of task information of a new task created by extracting a part of a past task. FIG. 16 is a diagram illustrating a second example of task information of a new task created by extracting a part of the past task. The management unit 66 may generate the task information of the new task by extracting a part of the task information of the past task. Although FIG. 15 and FIG. 16 explain examples when the electronic data is document, the management device 20 executes similar processing on the electronic data other than document.

For example, as illustrated in FIG. 15, the management unit 66 generates the task information of the new task by extracting some users of the participant users that are included in the task information of any one of the past tasks stored in the past task storage unit 65. Alternatively, for example, as illustrated in FIG. 16, the management unit 66 generates the task information of the new task by extracting some access destinations and pieces of authentication ticket information of the access destinations and the pieces of authentication ticket information of the documents that are included in the task information of any one of the past tasks stored in the past task storage unit 65. With this, when one task is contracted or one task is divided into a plurality of tasks, the management unit 66 can cause the new task to take over a part of the contents of the task.

Figure 17:
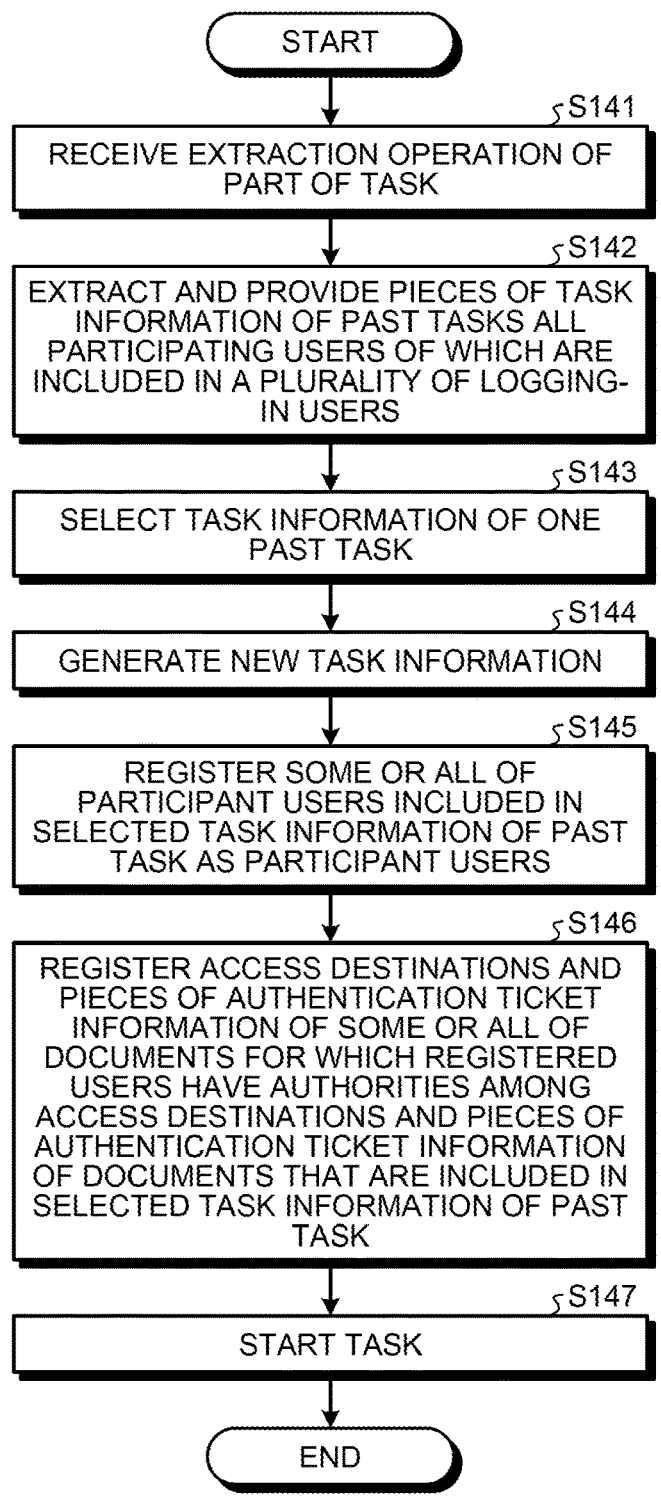
FIG. 17 is a flowchart illustrating processing when a part of the past task is extracted and the new task is started.

FIG. 17 is a flowchart illustrating processing when a part of the past task is extracted and the new task is started. Although the flowchart as illustrated in FIG. 17 explains an example when the electronic data is document, the management device 20 executes similar processing on the electronic data other than document. When extracting a part of the past task and starting the new task, the management unit 66 proceeds the processing in accordance with the flow as illustrated in FIG. 17.

First, at step S141, the management unit 66 receives an extraction operation of a part of the task. Subsequently, step S142, the management unit 66 extracts pieces of task information of past tasks all the participating users of which are included in the logging-in users from the past task storage unit 65 and provides the pieces of task information thus extracted. Thereafter, at step S143, the management unit 66 receives selection of the task information of any one past task among the pieces of task information of the past tasks that have been provided.

Then, at step S144, the management unit 66 generates the new task information and causes the current task storage unit 64 to store the new task information. Subsequently, at step S145, the management unit 66 registers some or all of the participant users included in the selected task information of the past task as the participant users in the new task information. The management unit 66 can extract some of the participant users in the past task by registering some of the participant users.

At step S146, the management unit 66 registers the access destinations and the pieces of authentication ticket information of some or all of the documents for which the users registered at step S145 have permission among the access destinations and the pieces of authentication ticket information of the documents that are included in the selected task information of the past task. The management unit 66 can extract the access destinations and the pieces of authentication ticket information of the documents in the past task by registering some of the access destinations and the pieces of authentication ticket information of the documents.

At step S147, the management unit 66 starts the cooperative task by the users. In this manner, the management unit 66 can generate the task information of the new task by extracting a part of the task information of the past task and start the new task.

Figure 18:
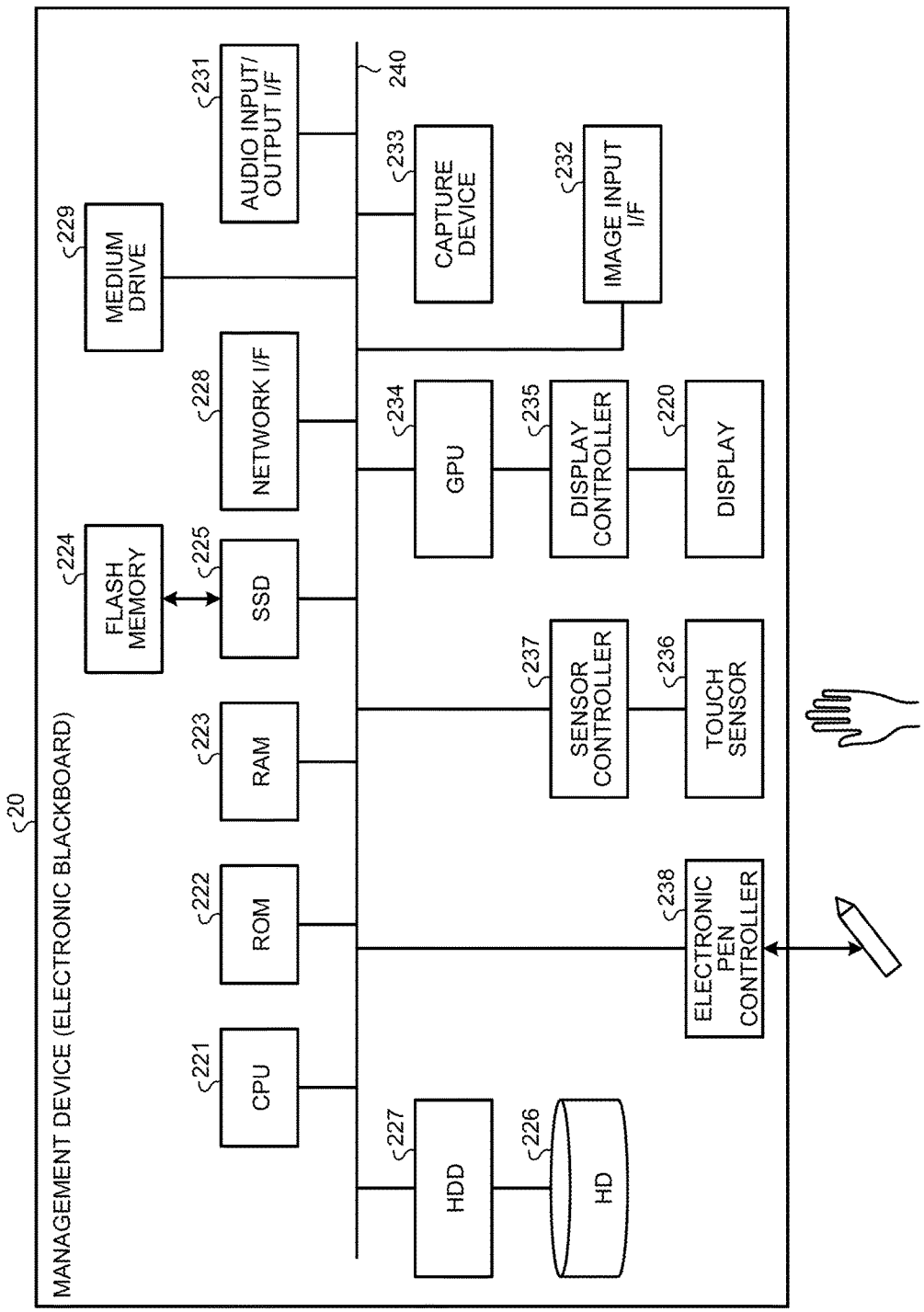
FIG. 18 is a diagram illustrating an example of the hardware configuration of a management device as an electronic blackboard.

FIG. 18 is a diagram illustrating an example of the hardware configuration of the management device 20 as an electronic blackboard. The management device 20 as the electronic blackboard includes a central processing unit (CPU) 221, a read only memory (ROM) 222, a random access memory (RAM) 223, a flash memory 224, a solid state drive (SSD) 225, a hard disk (HD) 226, a hard disk drive (HDD) 227, a network interface (I/F) 228, a medium drive 229, an audio input/output I/F 231, an image input I/F 232, a capture device 233, a graphics processing unit (GPU) 234, a display 220, a display controller 235, a touch sensor 236, a sensor controller 237, an electronic pen controller 238, and a bus line 240.

The CPU 221 controls the entire operations of the management device 20 as the electronic blackboard. The ROM 222 stores therein a computer program that is used for driving the CPU 221. The RAM 223 is used as a work area of the CPU 221. The flash memory 224 stores therein various data such as the control computer program for the management device 20 as the electronic blackboard. The management device 20 as the electronic blackboard may include an electrically erasable programmable read-only memory (EEPROM) or the like instead of the flash memory 224. The SSD 225 controls reading or writing of the various data from or into the flash memory 224 in accordance with control by the CPU 221.

The HD 226 stores therein pieces of data, the computer program, and other items. The HDD 227 controls reading or writing of the various data from or into the HD 226 in accordance with control by the CPU 221.

The network I/F 228 controls communications performed through a network. The medium drive 229 controls reading or writing (storage) of pieces of data from or into a recording medium such as a flash memory that can be detachably attached to the management device 20 as the electronic blackboard. The audio input/output I/F 231 processes input/output of an audio signal to and from a microphone speaker or the like in accordance with control by the CPU 221.

The image input I/F 232 inputs an image shot by a camera. For example, the capture device 233 captures a still image or a video image displayed on a display of another computer. The GPU 234 executes graphics processing. The GPU 234 executes image drawing processing based on information input by a user. The GPU 234 executes processing of synthesizing a drawn image, an image taken by the capture device 233, and an image input from the camera. The display controller 235 controls and manages screen display for outputting the output image from the GPU 234 to the display 220.

The touch sensor 236 detects a touch operation and input of information onto the display 220 by an electronic pen or a user's hand. The sensor controller 237 controls processing of the touch sensor 236 in accordance with control by the CPU 221.

The touch sensor 236 inputs coordinates and detects coordinates by an infrared ray cut method, as an example. A method of inputting the coordinates and detecting the coordinates is the following method. That is, a method in which two light emitting/receiving devices installed on both upper end portions of the display 220 emit a plurality of infrared rays in parallel with the display 220 and light receiving elements receive light reflected by a reflecting member provided on the periphery of the display 220 and returned along light paths same as the light paths of the emitted light is employed. The touch sensor 236 outputs, to the sensor controller 237, the identifications (IDs) of the infrared rays emitted from the two light emitting/receiving devices that are blocked by a substance. The sensor controller 237 specifies a coordinate position as a touched position of the substance.

Furthermore, as the touch sensor 236, various detection units such as an electrostatic capacitance-type touch panel specifying the touched position by detecting change in electrostatic capacitance, a resistance film-type touch panel specifying the touched position by detecting change in voltages of opposing two resistance films, an electromagnetic induction-type touch panel specifying the touched position by detecting electromagnetic induction generated by touching the contact substance with the display unit can be employed without being limited to the infrared ray cut method.

The electronic pen controller 238 communicates with the electronic pen so as to determine whether the tip or the tail of the electronic pen touches the display 220. It should be noted that the electronic pen controller 238 may determine whether a portion of the electronic pen that is gripped by a user or another portion of the electronic pen, in addition to the tip or the tail of the electronic pen, touches the display 220.

The bus line 240 is a component, such as an address bus and a data bus, for connecting the constituent components.

The computer program that is executed by the management device 20 as the electronic blackboard has a module configuration including a login module, a logout module, an input/output module, a current task storage module, a past task storage module, a management module, an electronic data access module, a remote access module, and a period management module. The CPU 221 (processor) loads and executes the computer program on the RAM 223 so as to cause the management device 20 as the electronic blackboard to function as the login unit 61, the logout unit 62, the input/output unit 63, the current task storage unit 64, the past task storage unit 65, the management unit 66, the electronic data access unit 67, the access receiver 68, and the period management unit 69.

It should be noted that the management device 20 is not limited to have the configuration as described above and may have a configuration in which at least a part of the login unit 61, the logout unit 62, the input/output unit 63, the current task storage unit 64, the past task storage unit 65, the management unit 66, the electronic data access unit 67, the access receiver 68, and the period management unit 69 is made to operate by a hardware circuit (for example, a semiconductor integrated circuit).

The computer program that is executed by the management device 20 in the embodiment is recorded and provided in a computer-readable recording medium, such as a compact disc read only memory (CD-ROM), a flexible disk (FD), a compact disc recordable (CD-R), and a digital versatile disc (DVD), as an installable or executable file.

The computer program that is executed by the management device 20 in the embodiment may be stored in a computer connected to a network such as the Internet and provided by being downloaded via the network. Furthermore, the computer program that is executed by the management device 20 in the embodiment may be provided or distributed via a network such as the Internet. For example, the computer program that is executed by the management device 20 may be incorporated and provided in a ROM.

The present invention provides an effect that a new task can be easily set when a plurality of users carry out the task cooperatively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A management device that manages a task that is executed by a plurality of users cooperatively, the management device comprising:
    a memory storing a program of instructions; and
    a processor configured to execute the program of instructions to
        manage a cooperative computing task executed by the plurality of users, the managing including
            generating an instance of task information associated with the cooperative computing task,
            associating the instance of task information with the plurality of users and one or more instances of electronic data associated with the cooperative computing task, the one or more instances of electronic data stored at one or more electronic data storage devices that are separate from the management device, such that the instance of task information includes
                participant user information indicating a plurality of participant users associated with the cooperative computing task,
                access destination information indicating a destination of the one or more instances of electronic data associated with the cooperative computing task, and
                authentication ticket information indicating authentication of the one or more instances of electronic data associated with the cooperative computing task, and
            selectively enabling access by at least one user of the plurality of users to a particular instance of electronic data associated with a particular cooperative computing task through the management device based on determining that the at least one user and an instance of authentication ticket information of the particular instance of electronic data are both associated with a particular instance of task information associated with the particular cooperative computing task, and
            generate a new instance of task information associated with a new cooperative computing task based on a past instance of task information associated with a past cooperative computing task previously executed using the management device.

2. The management device according to claim 1, wherein generating the new instance of task information includes causing the new instance of task information to include common participant user information with common participant user information of the past instance of task information, an entirety of users indicated in the participant user information associated with the past instance of task information being included in the plurality of users.

3. The management device according to claim 1, wherein generating the new instance of task information includes combining a plurality of instances of information associated with separate, respective past instances of task information to be a plurality of instances of information associated with the new instance of task information, an entirety of users indicated in the participant user information associated with at least one past instance of task information of the plurality of past instances of task information being included in the plurality of users.

4. The management device according to claim 1, wherein generating the new instance of task information includes extracting at least a limited portion of information associated with the past instance of task information to be an instance of information associated with the new instance of task information, an entirety of users indicated in the participant user information associated with the past instance of task information being included in the plurality of users.

5. The management device according to claim 4, wherein generating the new instance of task information includes registering at least a limited portion of users of the users indicated in the participant user information associated with the past instance of task information being included in the plurality of users as one or more participant users indicated in participant user information of the new instance of task information.

6. The management device according to claim 4, wherein the generating the new instance of task information includes registering at least a limited portion of access destination information of the past instance of task information as access destination of the new instance of task information.

7. A management method of managing a task that is executed by a plurality of users cooperatively by a management device, the method comprising:
    managing a cooperative computing task executed by the plurality of users, the managing including
        generating an instance of task information associated with the cooperative computing task,
        associating the instance of task information with the plurality of users and one or more instances of electronic data associated with the cooperative computing task, the one or more instances of electronic data stored at one or more electronic data storage devices that are separate from the management device, such that the instance of task information includes
            participant user information indicating a plurality of participant users associated with the cooperative computing task, access destination information indicating a destination of the one or more instances of electronic data associated with the cooperative computing task, and authentication ticket information indicating authentication of the one or more instances of electronic data associated with the cooperative computing task, and selectively enabling access by at least one user of the plurality of users to a particular instance of electronic data associated with a particular cooperative computing task through the management device based on determining that the at least one user and an instance of authentication ticket information of the particular instance of electronic data are both associated with a particular instance of task information associated with the particular cooperative computing task; and generating a new instance of task information associated with a new cooperative computing task based on a past instance of task information associated with a past cooperative computing task previously executed using the management device.

8. The method according to claim 7, wherein generating the new instance of task information includes causing the new instance of task information to include common participant user information with common participant user information of the past instance of task information, an entirety of users indicated in the participant user information associated with the past instance of task information being included in the plurality of users.

9. The method according to claim 7, wherein generating the new instance of task information includes combining a plurality of instances of information associated with separate, respective past instances of task information to be a plurality of instances of information associated with the new instance of task information, an entirety of users indicated in the participant user information associated with at least one past instance of task information of the plurality of past instances of task information being included in the plurality of users.

10. The method according to claim 7, wherein generating the new instance of task information includes extracting at least a limited portion of information associated with the past instance of task information to be an instance of information associated with the new instance of task information, an entirety of users indicated in the participant user information associated with the past instance of task information being included in the plurality of users.

11. The method according to claim 10, wherein generating the new instance of task information includes registering at least a limited portion of users of the users indicated in the participant user information associated with the past instance of task information being included in the plurality of users as one or more participant users indicated in participant user information of the new instance of task information.

12. The method according to claim 10, wherein the generating the new instance of task information includes registering at least a limited portion of access destination information of the past instance of task information as access destination of the new instance of task information.

13. A non-transitory computer-readable medium storing a program of instructions that, when executed by an information processing device, cause the information processing device to perform a method of managing a task that is executed by a plurality of users cooperatively by a management device, the method comprising:

managing a cooperative computing task executed by the plurality of users, the managing including generating an instance of task information associated with the cooperative computing task, associating the instance of task information with the plurality of users and one or more instances of electronic data associated with the cooperative computing task, the one or more instances of electronic data stored at one or more electronic data storage devices that are separate from the management device, such that the instance of task information includes participant user information indicating a plurality of participant users associated with the cooperative computing task, access destination information indicating a destination of the one or more instances of electronic data associated with the cooperative computing task, and authentication ticket information indicating authentication of the one or more instances of electronic data associated with the cooperative computing task, and selectively enabling access by at least one user of the plurality of users to a particular instance of electronic data associated with a particular cooperative computing task through the management device based on determining that the at least one user and an instance of authentication ticket information of the particular instance of electronic data are both associated with a particular instance of task information associated with the particular cooperative computing task; and generating a new instance of task information associated with a new cooperative computing task based on a past instance of task information associated with a past cooperative computing task previously executed using the management device.

14. The non-transitory computer-readable medium according to claim 13, wherein generating the new instance of task information includes causing the new instance of task information to include common participant user information with common participant user information of the past instance of task information, an entirety of users indicated in the participant user information associated with the past instance of task information being included in the plurality of users.

15. The non-transitory computer-readable medium according to claim 13, wherein generating the new instance of task information includes combining a plurality of instances of information associated with separate, respective past instances of task information to be a plurality of instances of information associated with the new instance of task information, an entirety of users indicated in the participant user information associated with at least one past instance of task information of the plurality of past instances of task information being included in the plurality of users.

16. The non-transitory computer-readable medium according to claim 13, wherein generating the new instance of task information includes extracting at least a limited portion of information associated with the past instance of task information to be an instance of information associated with the new instance of task information, an entirety of users indicated in the participant user information associated with the past instance of task information being included in the plurality of users.

17. The non-transitory computer-readable medium according to claim 16, wherein generating the new instance of task information includes registering at least a limited portion of users of the users indicated in the participant user information associated with the past instance of task information being included in the plurality of users as one or more participant users indicated in participant user information of the new instance of task information.

18. The non-transitory computer-readable medium according to claim 16, wherein the generating the new instance of task information includes registering at least a limited portion of access destination information of the past instance of task information as access destination of the new instance of task information.

\* \* \* \* \*